United States Patent
Teshima

(10) Patent No.: US 9,263,162 B2
(45) Date of Patent: Feb. 16, 2016

(54) METHOD FOR MANUFACTURING MICROSTRUCTURE

(71) Applicant: CANON KABUSHIKI KAISHA, Tokyo (JP)

(72) Inventor: Takayuki Teshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/473,837

(22) Filed: Aug. 29, 2014

(65) Prior Publication Data

US 2015/0060405 A1 Mar. 5, 2015

(30) Foreign Application Priority Data

Aug. 30, 2013 (JP) ................. 2013-178957
Jul. 16, 2014 (JP) ................. 2014-145917

(51) Int. Cl.
| | | |
|---|---|---|
| C23F 1/00 | (2006.01) | |
| G21K 1/06 | (2006.01) | |
| C23F 1/12 | (2006.01) | |
| C09K 13/02 | (2006.01) | |
| C09K 13/08 | (2006.01) | |
| C23F 1/02 | (2006.01) | |
| C23F 1/18 | (2006.01) | |
| C23F 1/28 | (2006.01) | |
| C23F 1/44 | (2006.01) | |
| C25D 1/08 | (2006.01) | |

(52) U.S. Cl.
CPC ............... *G21K 1/067* (2013.01); *C09K 13/02* (2013.01); *C09K 13/08* (2013.01); *C23F 1/02* (2013.01); *C23F 1/12* (2013.01); *C23F 1/18* (2013.01); *C23F 1/28* (2013.01); *C23F 1/44* (2013.01); *C25D 1/08* (2013.01); *G21K 2201/067* (2013.01); *G21K 2207/005* (2013.01)

(58) Field of Classification Search
CPC ..... C23C 18/162; C23C 18/1651; C23F 1/02; C23F 1/12; C23F 1/18; C23F 1/44; G21K 2201/067; G21K 2207/005; G21K 1/067
USPC .............. 216/39, 79; 250/336.1; 378/71, 145, 378/154; 428/172, 457
See application file for complete search history.

(56) References Cited

U.S. PATENT DOCUMENTS

| | | | | |
|---|---|---|---|---|
| 4,601,784 | A * | 7/1986 | Krulik .............................. | 216/83 |
| 7,033,515 | B2 * | 4/2006 | Kouma et al. ..................... | 216/2 |
| 2011/0182403 | A1 * | 7/2011 | Nakamura ....................... | 378/36 |

FOREIGN PATENT DOCUMENTS

| | | |
|---|---|---|
| JP | 2010-185728 A | 8/2010 |
| JP | 2013-029463 A | 2/2013 |
| WO | 2013/024562 A1 | 2/2013 |

* cited by examiner

*Primary Examiner* — Duy Deo
*Assistant Examiner* — Maki Angadi
(74) *Attorney, Agent, or Firm* — Canon U.S.A. Inc., IP Division

(57) ABSTRACT

A method is provided for producing a microstructure. The method includes the first step of forming a supporting layer on a base substrate including a silicon substrate provided with recessed sections at a first surface thereof and a metal structure filling the recessed sections so as to come in contact with the metal structure at the first surface, the second step of forming a structure including the metal structure and the supporting layer by selectively etching the silicon substrate to expose at least the surface of the metal structure opposite the surface in contact with the supporting layer from the silicon substrate, and the third step of selectively etching the supporting layer of the metal structure.

20 Claims, 7 Drawing Sheets

METHOD FOR MANUFACTURING MICROSTRUCTURE

BACKGROUND OF THE INVENTION

1. Field of the Invention

The present application relates to a method for producing a microstructure.

2. Description of the Related Art

Grids having periodic structures are used as spectrometer elements in various types of apparatus. In particular, a shield grating made of a metal having a high X-ray absorptance is used for nondestructive inspection, medical practice and the like.

The shield grating used in an X-ray Talbot interferometer is one of the exemplary shield gratings.

The X-ray Talbot interferometry is one of the imaging methods using X-ray phase contrast (X-ray phase imaging methods).

The X-ray Talbot interferometry will be simply described below.

In an X-ray Talbot interferometer, spatially coherent X-rays pass through a test object and a diffraction grating capable of diffracting X-rays to form an interference pattern.

A shield grating adapted to periodically block X-rays is located at the position where the interference pattern is formed, thus forming a moire pattern. This moire pattern is detected with a detector, and the information of the test object is collected from the detection result. In Talbot-Lau interferometer, which is a type of the Talbot interferometer, an X-ray shield grating is used to form a virtual state in which very small X-ray sources are arranged, thereby enhancing the X-ray spatial coherence of X-rays.

A typical shield grating used for the Talbot interferometry has a structure in which X-ray transmitting portions and X-ray shielding portions are periodically arranged.

The shielding portions are often defined by a metal structure including main portions having a high aspect ratio, made of a metal having a high X-ray absorptance, such as gold, wherein the aspect ratio refers to the ratio (h/w) of the height or depth of a structure to the width thereof. For forming a shield grating including shielding portions defined by such a metal structure, Japanese Patent Laid-Open No. 2010-185728 discloses a method including the operation of filling a mold with a metal by plating. In this patent document, the mold is prepared by forming a groove in a silicon body by reactive etching. The shield grating is formed by depositing a metal in the groove by plating.

In this method, however, the X-ray transmitting portions of the shield grating are formed of silicon.

Silicon has a lower X-ray absorptance than X-ray absorbing metals such as gold. It is however not 0 and silicon absorbs X-rays.

Consequently, the contrast between the amount of X-rays transmitted through the shielding portions and the amount of X-rays transmitted through the transmitting portions (hereinafter may be referred to as X-ray blocking contrast) can be reduced, or the amount of X-rays reaching the detector can be reduced.

SUMMARY OF THE INVENTION

Accordingly, a method is provided for producing a microstructure. The method includes the first step of forming a supporting layer on a base substrate including a silicon substrate provided with recessed sections at a first surface thereof and a metal structure filling the recessed sections so as to come in contact with the metal structure at the first surface, the second step of forming a structure including the metal structure and the supporting layer by selectively etching the silicon substrate to expose at least the surface of the metal structure opposite the surface in contact with the supporting layer from the silicon substrate, and the third step of selectively etching the supporting layer of the metal structure.

Further features of the present invention will become apparent from the following description of exemplary embodiments with reference to the attached drawings.

DESCRIPTION OF THE EMBODIMENTS

Figure 1A:
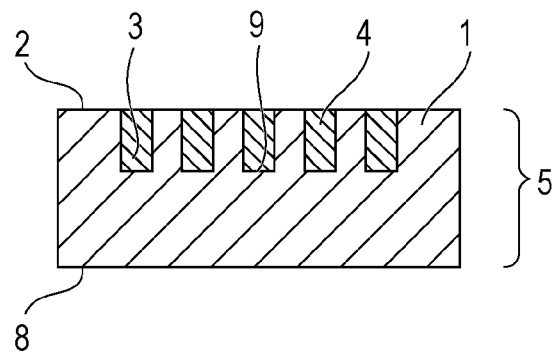
FIGS. 1A to 1D are process diagrams illustrating a method for producing a microstructure according to an embodiment.

Embodiments of the present invention will now be described in detail. The following embodiment will illustrate a method for producing a microstructure adapted to use as a shield grating and including X-ray transmitting portions having a higher X-ray transmittance than the transmitting portions of the X-ray shield grating disclosed in the above-cited patent document.

In order to increase the X-ray transmittance of the transmitting portions, it can be effective to remove silicon defining the transmitting portions. In other words, when the silicon is removed, the transmitting portions are defined by spaces between the shielding portions. The transmitting portions of such a shield grating are defined by air having a higher transmittance than silicon when the X-ray screen grip is in the air. The present inventors however found that if the silicon of a screen grip whose shielding portions are secured in a silicon body is removed by etching, the shielding portions can be undesirably deformed by the etching. According to the findings of the present inventors, for example, when silicon is etched by a wet process, etchant can foam to apply pressure locally to the shielding portions, thereby deforming the shielding portions. The meaning of "to deform the shielding portion" used herein includes "to disorder the arrangement of the shielding portions".

In the present embodiment, in order to relieve the deformation of the shielding portions caused by etching on silicon, a metal structure defining the shielding portions is supported by a supporting layer before etching. The metal structure is thus transferred to the supporting layer by the etching. After the etching on the silicon, the supporting layer is removed by etching. Thus, a microstructure capable of being used as an X-ray shield grating is produced. In this instance, a wet etching process using an etchant less foamable than the etchant used for silicon or a dry etching process is applied to the etching on the supporting layer. The transfer of the metal structure may be performed several times. In this instance, it is only required that the etching on the supporting layer to which the metal structure has been finally transferred be performed in a dry process or a wet process using an etchant less foamable than the etchant used for silicon.

The method for producing a microstructure according to the present embodiment will now be further described in detail. The method includes a first step, a second step, and a third step. In the first step, a supporting layer is formed so as to come in contact with the metal structure exposed at a first surface of a silicon substrate. The metal structure is disposed in such a manner that the main portions thereof fill the recessed sections formed at the first surface of the silicon substrate. In the first step, such a metal structure is held by the supporting layer. In the second step, the silicon substrate is selectively etched, thereby exposing at least the surfaces of the main portions of the metal structure opposite the contact areas between the main portions of the metal structure and the supporting layer from the silicon substrate. Thus, a structure including the metal structure and the supporting layer is formed. In the third step, the supporting layer of the structure formed in the second step, including the metal structure and the supporting layer is selectively etched to yield a microstructure.

The microstructure produced by the method of the present embodiment can be used as an X-ray shield grating. In the microstructure, the main portions of the metal structure function as X-ray shielding portions, and the spaces between the main portions of the metal structure function as X-ray transmitting portions. Desirably, the X-ray shielding portions can block 80% or more of incoming X-rays.

For example, if the shielding portions are made of gold and incoming X-rays have an energy of 17.7 keV, the gold shielding portions each desirably have a thickness of 20 μm or more so as to block 80% or more of X-rays having entered perpendicularly. However, as the thickness of the gold shielding portion is increased, the aspect ratio of the grid increases. This makes it difficult to produce the grid. Preferably, the thickness of the gold portion is about 200 μm or less. The microstructure produced by the method of the present embodiment can be used particularly as the shield grating in an X-ray Talbot interferometer. The shield gratings of X-ray Talbot interferometers generally include one-dimensional grids and two-dimensional grids. A one-dimensional grid has a structure in which transmitting portions and shielding portions are alternately arranged in one direction in a line-and-space pattern. A two-dimensional structure has a structure in which transmitting portions and shielding portions are arranged in two directions in such a manner that the transmitting portions are arranged in a structure having the shielding portions. In the line-and-space pattern, some of the shielding portions may be connected to each other to prevent the deformation thereof. The shield grating of the Talbot interferometer generally has a period in the range of 2.4 μm to 12 μm.

The method for producing the microstructure will be described below with reference to the drawings. Although the present embodiment will illustrate a method for producing a microstructure used as an X-ray shield grating of an X-ray Talbot interferometer, the shield grating may be used for other applications.

Referring now to FIGS. 1A to 1D, a method for producing a two-dimensional or one-dimensional microstructure will be described.

The two-dimensional microstructure described in the present embodiment includes a metal structure having a plurality of holes two-dimensionally arranged therein. The plurality of holes are spaces between the main portions of the metal structure and function as the transmitting portions of the shield grating when the microstructure is used as a shield grating.

The two-dimensional microstructure can be used as a two-dimensional shield grating.

On the other hand, the one-dimensional microstructure includes a metal structure having a plurality of main portions arranged in a line-and-space manner with spaces therebetween. The spaces between the plurality of main portions of the metal structure function as the transmitting portions of the shield grating when the microstructure is used as a shield grating. The one-dimensional microstructure can be used as a one-dimensional shield grating.

The detailed procedures of the first to third steps of the method will be described below.

First Step

The first step includes the sub-step of preparing a base substrate 5 including a silicon substrate 1 provided with recessed sections 3 in a first surface 2 thereof and a metal structure 4 including main portions filling the recessed sections, and the sub-step of forming a supporting layer 7 so as to come in contact with the main portions of the metal structure 4 exposed at the first surface 2.

FIG. 1A shows the sub-step of preparing the base substrate 5. In the present embodiment, in the sub-step of preparing the base substrate 5, the recessed sections 3 are formed in the first surface 2 of the silicon substrate 1 and filled with a metal. Thus, the base substrate 5 is prepared which includes the silicon substrate 1 provided with the recessed sections 3 at the first surface 2 thereof and the metal structure 4 filling the recessed sections 3. The recessed sections 3 are formed so as to fit the shape of the main portions of the metal structure 4. More specifically, for producing a two-dimensional microstructure, the recessed sections 3 are formed in the positions of the silicon substrate 1 corresponding to the positions where the main portions of the metal structure 4 will be located in the two-dimensional microstructure. Also, for producing a one-dimensional microstructure, the recessed sections 3 are formed corresponding to the positions in the silicon substrate 1 where the main portions of the metal structure 4 will be located in the one-dimensional microstructure. In the following description, recessed sections formed corresponding to the positions where the main portions of the metal structure 4 will be located in a two-dimensional microstructure are referred to as two-dimensionally formed recessed sections. Similarly, recessed sections formed corresponding to the positions where the main portions of the metal structure will be disposed in a one-dimensional microstructure are referred to as one-dimensionally formed recessed sections. The sub-step of preparing the base substrate 5 will be further described in detail.

Figure 4A:
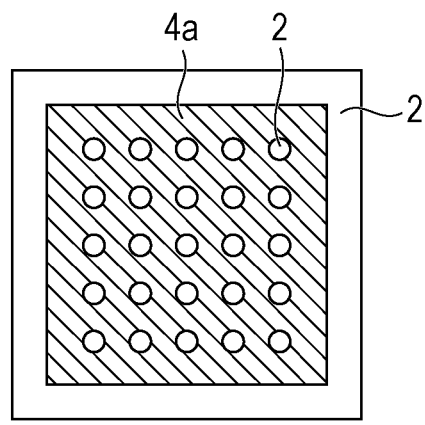
FIGS. 4A and 4B are top views of base substrates according to different embodiments.
Figure 4B:
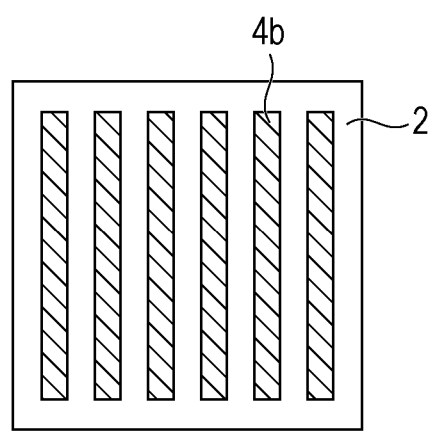

FIGS. 4A and 4B are top views of structures each in which main portions of a metal structure are formed in recessed sections in the first surface 2 of a silicon substrate. For example, two-dimensionally formed recessed sections may be filled with a metal to prepare a base substrate 5 including a mesh-like metal structure 4a in the first surface 2 of the silicon substrate, as shown in FIG. 4A. One-dimensionally formed recessed sections may be filled with a metal to prepare a base substrate 5 including a metal structure having linear main portions 4b in the first surface 2 of the silicon substrate 1, as shown in FIG. 4B. Alternatively, the first surface 2 of the silicon substrate 1 may be provided with protrusions (protruding structure) thereon to define relatively recessed spaces between the protrusions. In the description herein, such relatively recessed spaces are also referred to as the recessed sections 3 provided at the first surface 2 of the silicon substrate 1.

When the microstructure produced by the method of the present embodiment is used as a shield grating, the recessed sections 3 function as the shielding portions. Accordingly, the recessed sections 3 are formed at the first surface 2, corresponding to the shape of the shielding portions of the shield grating. The recessed sections 3 may be formed by, for example, etching.

This etching may be performed by wet etching with an alkaline aqueous solution taking advantage of the difference in etching rate among the crystal orientation planes of silicon.

Dry etching may be applied such as ion sputtering or reactive gas plasma etching. For dry etching using a reactive gas plasma, reactive ion etching (RIE) is suitable to form recessed sections 3 having a high aspect ratio. In particular, the Bosch process, in which etching using $SF_6$ gas and deposition of a side wall protecting film using $C_4F_8$ gas are alternately performed, is suitable as RIE to form recessed sections 3 having a higher aspect ratio.

By forming the recessed sections 3 having a high aspect ratio at a narrow pitch here, there will be provided a microstructure including a metal structure having main portions arranged at a narrow pitch with a high aspect ratio.

The recessed sections 3 are filled with a metal. This operation may be performed by melting a metal disposed over the recessed sections 3. Alternatively, CVD (chemical vapor deposition), vacuum sputtering, vacuum evaporation may be applied. Plating is also useful to fill the recessed sections.

A process for filling the recessed sections 3 by plating will be simply described by way of example. First, an insulating layer is formed over the surfaces of the recessed sections 3, and the portions of the insulating film on the bottoms of the recessed sections 3 are removed to expose the silicon of the substrate at the bottom of the recessed sections 3. Metal films are deposited on the silicon portions exposed at the bottoms of the recessed sections 3. The resulting structure is used as a mold. Electricity is applied to the mold through the silicon substrate. Thus a metal is deposited on the metal films to fill the recessed sections 3. If the metal deposited by any of the above-described techniques is so excessive in amount as to extend off the recessed sections 3, the structure may be used as it is, or the excess portion may be removed by polishing. As described above, by forming recessed sections at the first surface of a silicon substrate and filling the recessed sections with a metal, a base substrate is prepared which includes the silicon substrate provided with the recessed sections at the first surface thereof and a metal structure filling the recessed sections. The nonmetal portions between the recessed sections 3 (unrecessed sections of the silicon substrate 1) of the base substrate 5 will act finally as spaces between the main portions of the metal structure 4.

Hence, if the recessed sections 3 are two-dimensionally formed, the spaces 6 between the main portions of the metal structure 4 are two-dimensionally arranged. When the recessed sections 3 are one-dimensionally formed, the spaces 6 between the main portions of the metal structure 4 are one-dimensionally arranged.

When the microstructure produced by the method of the present embodiment is used as a shield grating, the spaces 6 between the main portions of the metal structure 4 act as the shielding portions. In the present embodiment, the entirety of each recessed section 3 is not necessarily filled with a metal. For example, the thickness of the metal structure 4 may be smaller than the depth of the recessed sections 3, or cavities or voids may be formed in the metal structure 4.

Metals that can be used in the present embodiment include copper, nickel, iron and gold, and alloys thereof. From the viewpoint of using the microstructure as a shield grating, gold or a gold alloy is advantageous because of their ability to block X-rays.

The sub-step of preparing the base substrate is not limited to the above-described operation. For example, a commercially available base substrate including a silicon substrate provided with recessed sections at the first surface thereof and a metal structure filling the recessed sections may be used.

Figure 1B:
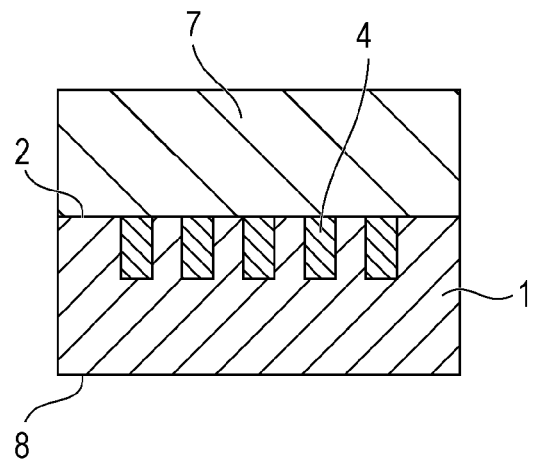

Turning to FIG. 1B, the sub-step of forming a supporting layer will be described. In this step, a supporting layer 7 is formed so as to come in contact with the main portions of the metal structure 4 exposed at the first surface 2 of the silicon substrate 1. More detailed operation of this step will be described.

The supporting layer 7 in contact with the main portions of the metal structure 4 reinforces the metal structure. By reinforcing the metal structure 4 by the supporting layer 7, the metal structure 4 is prevented from being deformed by etching on the silicon substrate 1 performed in the second step described later. This also prevents the pitch of the spaces 6 from becoming irregular. Desirably, the supporting layer 7 is formed over the entirety of the first surface 2. The supporting layer 7 formed over the entirety of the first surface 2 prevents the silicon substrate 1 from being removed from the first surface by etching in the second step, and thus prevents the metal structure 4 from being deformed by the etching. Thus the supporting layer 7 has the function of maintain the pitch of the spaces 6 between the main portions of the metal structure 4. The material of the supporting layer 7 is selected from the materials having low etching selectivities to silicon in the etching of the second step. A material having a low etching selectivity to silicon mentioned herein refers to a material whose etching rate is $1/100$ or less of the etching rate of silicon. If an alkaline aqueous solution is used for the etching in the second step, the material having a low etching selectivity to silicon may be selected from, but is not limited to, copper, nickel, iron, alloys thereof, and the like.

The supporting layer 7 may be formed by CVD (chemical vapor deposition), vacuum sputtering, or vacuum evaporation. Plating is also advantageous. Plating can form a thick supporting layer 7 in a short time.

If plating is applied to form the supporting layer 7, electricity may be directly applied to the main portions of the metal structure 4, or a seed layer may be formed on the main portions of the metal structure 4 and the first surface 2 of the silicon substrate 1 so as to apply electricity through the seed layer.

Second Step

Figure 1C:
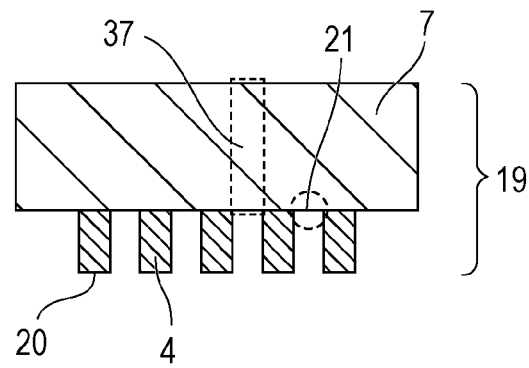

The second step shown in FIG. 1C will be described. In the second step, the silicon substrate 1 is removed by etching more selective to the silicon substrate 1 than the supporting layer 7 and the metal structure 4 to yield a structure 19 including the metal structure 4 and the supporting layer 7. In the second step, the etching on the silicon substrate 1 is performed so as to expose at least the surfaces 20 of the main portions of the metal structure 4 opposite the contact areas between the main portions and the supporting layer 7. Although the etching on the silicon substrate 1 is, desirably, performed from the second surface 8 opposing the first surface 2, it may be performed from a third face adjacent to the first surface (surface other than the first or second surface) or from some of the surfaces of the silicon substrate 1. The second step will be further described in detail.

The etching on the silicon substrate 1 is not necessarily performed until the entirety of the silicon substrate 1 is completely removed, as long as the surfaces 20 of the main portions of the metal structure 4 opposite the contact areas thereof with the supporting layer 7 are exposed. In use as an X-ray shield grating, however, from the viewpoint of increasing X-ray blocking contrast, it is desirable that at least half the height of the metal structure 4, on average, be exposed from the silicon substrate 1, and more desirably ⅔ or more of the height thereof be exposed. The height of the metal structure 4 is the length thereof in the same direction as the depth of the recessed sections.

When both of the etching rate of the metal structure 4 and the etching rate of the supporting layer 7 are 1/100 or less to the etching rate of the silicon substrate 1, the silicon substrate 1 is considered to be more selectively etched than the metal structure 4 and the supporting layer 7.

The etching on the silicon substrate 1 may be performed by dry etching or wet etching. For wet etching, for example, fluoronitric acid or an alkaline solution may be used for etching the silicon substrate 1.

Gold and gold alloys are resistant to etching with fluoronitric acid, whereas copper, nickel and iron, and alloys thereof are etched with fluoronitric acid. If the metal structure 4 or the supporting layer 7 is made of copper, nickel, iron or an alloy thereof, fluoronitric acid is not used. To alkaline aqueous solution, gold and gold alloys, copper, nickel, iron and alloys thereof are resistant. If the metal structure 4 and the supporting layer 7 are made of these materials, the etching is performed using an alkaline aqueous solution. The alkaline aqueous solution may be a solution of, for example, potassium hydroxide, sodium hydroxide, tetramethylammonium hydroxide, ammonium, or hydrazine. However, the alkaline solution is not limited to these.

The wet etching on the silicon substrate 1 proceeds with violent foaming. When the etching on the silicon substrate 1 proceeds to start etching the bottoms 9 of the recessed sections 3, the main portions of the metal structure 4 are pushed up by the foaming. Particularly when the pitch of the recessed sections 3 is narrow, the time taken for the etching on the silicon substrate 1 to reach the bottoms 9 of the recessed sections 3 is likely to vary and have distribution. Accordingly, main portions of the metal structure 4 at which the etching on the silicon substrate 1 reaches the bottom 9 of the recessed section 3 in the early stage can be deformed by the foaming of the etchant. Particularly when the metal structure 4 is made of gold or a gold alloy, which are relatively soft, marked deformation can occur.

A local deformation of the metal structure 4 induces to vary the pitch of the paces 9 between the main portions of the metal structure 4. This causes the pitch of the transmitting portions to vary when the microstructure produced by the method of the present embodiment is used as an X-ray shield grating. Accordingly, when the microstructure is used in a Talbot interferometer, the variation in the pitch of the transmitting portions may result in reduced image quality.

In the present embodiment, since the supporting layer 7 is formed in the first step, the metal structure 4 will be supported by the supporting layer 7 when the silicon substrate is etched, thereby preventing the metal structure 4 from being locally deformed.

This is because the main portions of the metal structure 4 are supported by the supporting layer 7 while the silicon substrate 1 is etched (during foaming), and the etching on the silicon substrate 1 stops spontaneously at the time when the silicon substrate 1 has been removed.

In other words, the second step is performed to transfer the metal structure 4 to the supporting layer 7 from the silicon substrate 1 by selectively etching the silicon substrate 1 for removing it from the base substrate 5 (including the silicon substrate, the metal structure and the supporting layer in contact with the metal structure) formed in the first step.

Third Step

The third step shown in FIG. 1D will now be described below. In the third step, the supporting layer 7 of the structure 19 formed in the second step, including the metal substrate 4 and the supporting layer 7, is selectively etched. The third step, however, need not be directly performed on the structure 19 formed in the second step. For example, between the second step and the third step, a mask layer used for the etching of the third step may be formed, or a second supporting layer may be formed around the main portions of the metal structure 4, followed by second transfer of the metal structure 4 in the third step. Even if the structure 19 formed in the second step is subjected to such work, the structure 19 is considered to be the structure prepared in the second step as long as it includes the metal structure 4 and the supporting layer 7 formed in the first step.

The third step will be further described in detail. In the third step, desirably, the portions of the supporting layer 7 from the contact areas 21 thereof with the spaces between the main portions of the metal structure 4 to the surface opposite the contact areas 21 (portions to function as the transmitting portions of the shield grating. These portions hereinafter may be referred to as first portions 37) are removed from the metal structure by etching. In the description herein, to remove the first portions 37 of the supporting layer 7 from the metal structure 4 means separating the first portions 37 of the supporting layer 7 from the metal structure 4 with the shape of the first portions partially or entirely maintained, or dissolving the entirety of each first portion 37 of the supporting layer 7. By etching the contact areas 21 of the supporting layer 7 with the spaces between the main portions of the metal structure 4, the first portions 37 of the supporting layer 7 are separated from the metal structure 4. The contact areas 21 of the supporting layer 7 with the spaces between the main portions of the metal structure 4 refer to, for example, the portions of the supporting layer 7 come in contact with the etchant filling the spaces between the main portions of the metal structure 4 when the structure 19 including the supporting layer 7 and the metal structure 4 is immersed in an etchant, or the contact areas of the supporting layer 7 with the air filling the spaces between the main portions of the metal structure 4 when the structure 19 including the supporting layer 7 and the metal structure 4 is in the air.

For etching the supporting layer 7, it is advantageous to select a method capable of etching the supporting layer 7 more selectively than the metal structure 4. The method capable of etching the supporting layer 7 more selectively than the metal structure 4 is an etching having an etching selectivity of the metal structure 4 to the supporting layer 7 (ratio of the etching rate of the metal structure 4 to the etching rate of the supporting layer 7) of 1/100 or less. The etching on the supporting layer 7 may be performed by dry etching or wet etching.

Figure 1D:
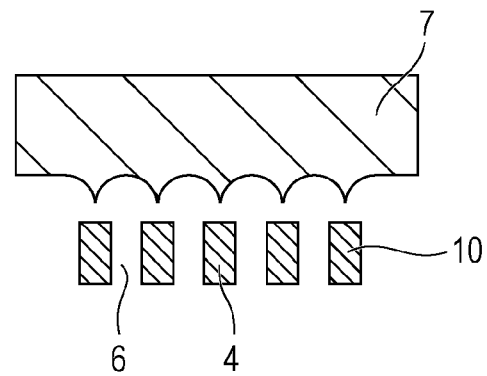

During etching, the etching gas or etchant enters the spaces 6 between the main portions of the metal structure 4, and thus the supporting layer 7 is etched from the surface 17 thereof including the contact areas with the metal structure 4, thereby separated from the metal structure 4, as shown in FIG. 1D. At this time, the supporting layer 7 is often separated with the shape thereof maintained.

If an etching mask layer 15 is formed at the surface 17 of the supporting layer 7 in contact with the metal structure 4, the supporting layer 7 is etched from the surface 27 thereof opposite the surface 17 in contact with the metal structure 4, thereby separated from the metal structure 4. At this time, the separated supporting layer 7 is often dissolved in etchant, having no shape.

The material of the etching mask layer 15 is selected from the materials having low etching selectivities to the supporting layer 7. A material having a low etching selectivity to the supporting layer 7 mentioned herein refers to a material whose etching rate is 1/100 or less of the etching rate of the supporting layer 7. In addition, the material of the etching mask layer is selected from the materials that can be removed without damaging the metal structure 4. The etching mask layer may be formed by vacuum sputtering or vacuum evaporation, or by spin coating with a photoresist or the like. Photoresist can be easily removed using an organic solvent without damaging the metal structure 4. If the metal structure 4 is made of gold or a gold alloy and the supporting layer 7 is made of copper, nickel, iron, or an alloy thereof, wet etching is effective. In dry etching, the etching selectivity of the metal structure 4 to the supporting layer 7 is close to 1.

For wet etching, a process that does not or hardly cause foaming is selected because the metal structure 4 can be deformed by foaming during etching, as described in the third step. A wet etching process that does not cause foaming may be a process in which the metal cation in the etchant oxidizes the supporting layer and is thereby reduced. For example, the use of a strong acid aqueous solution of perchloric acid containing tetravalent cerium ion enables copper, nickel, iron, or alloys thereof to be etched without foaming. Since copper, nickel, iron or their alloys are oxidized into cations and dissolved in the aqueous solution while the tetravalent cerium cation is reduced into trivalent ion, foaming does not occur. Similarly, in the use of a strong acid aqueous solution containing trivalent iron ion, copper, nickel, iron or their alloys are oxidized into cations and dissolved in the aqueous solution while the trivalent iron ion is reduced into divalent ion, and thus foaming does not occur. In a conventional process, metal is etched with a protonic acid, such as hydrochloric acid, nitric acid, or sulfuric acid. The protonic acids however generate hydrogen when used in etching on metals.

If the metal structure is transferred to the supporting layer through several transferring operations, the etching on the supporting layer performed after the final transferring operation can be performed by a process unlikely to deform the metal structure. For example, to etch the supporting layer 7 through an etching mask layer covering the surface 17 of the supporting layer 7 in contact with the main portions of the metal structure 4 is regarded as to further transfer the metal structure 4 transferred to the supporting layer 7 from the silicon substrate 1 to the etching mask layer. In this instance, the etching mask layer functions as a second supporting layer. For this etching on the supporting layer 7, any process may be applied, such as a process using a protonic acid. If the strength of the etching mask layer is not sufficient, however, suitable is an etching process unlikely to damage the metal structure 4 also for the etching on the supporting layer 7.

When the supporting layer (first supporting layer) 7 to which the metal structure 4 is first transferred is formed, the surroundings of the main portions of the metal structure are filled with the silicon of the silicon substrate. The first supporting layer 7 therefore supports the metal structure 4 at portions of the metal structure 4 exposed at the surface of the silicon substrate 1. The supporting layer to which the metal structure is transferred secondly or later can support the metal structure more tightly than the first supporting layer by being formed so as to surround the main portions of the metal structure, thereby preventing the metal structure from being deformed by etching (for transfer).

Thus, a microstructure 10 in which local deformation is more suppressed than ever before can be produced through the first to third steps described above. The microstructure 10 produced by the method of the present embodiment can be used as an shield grating for X-ray phase imaging whose pitch is not substantially vary. Since the spaces 6 between the main portions of the metal structure 4 are vacant, the transmitting portions of the shield grating can have a higher X-ray transmittance than the microstructures in which the spaces between the main portions of the metal structure are filled with silicon. Thus, the microstructure produced by the method of the present embodiment can be used as an X-ray shield grating having a large X-ray transmission contrast.

The method of the present embodiment may include other step performed after the third step. For example, if a mask layer formed between the second and the third step remains in contact with the metal structure after the third step, it is advantageous in view of X-ray transmission contrast to remove the mask layer after the third step by a step for separating the mask layer from the metal structure. If the metal structure is transferred several times, the step of forming a second supporting layer may be performed between the second step and the third step, and the second supporting layer may be removed in a step for selectively etching the second supporting layer of the structure including the metal structure and the second supporting layer after the third step.

EXAMPLES

Examples of the above-described embodiment will now be described.

Example 1

Example 1 illustrates a method of the above embodiment with reference to FIGS. 2A to 2E and FIGS. 3A to 3G.

In Example 1, a base substrate 5 is prepared which includes a silicon substrate 1 provided with recessed sections 3 in a first surface 2 thereof and a metal structure filling the recessed sections 3.

Figure 3A:
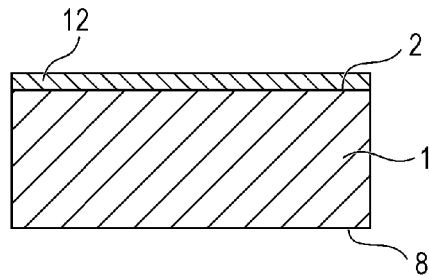
FIGS. 3A to 3G are process diagrams illustrating the method for producing the microstructure of Example 1.

As shown in FIG. 3A, the silicon substrate 1 has a diameter of 150 mm and a thickness of 625 μm, and includes a 1.5 μm thick thermally oxidized silicon film 12 on the first surface 2 thereof. A positive resist layer is formed on the thermally oxidized silicon film 12, and is then subjected to semiconductor photolithography to form a resist dot pattern in a region of 130 mm in diameter. The dots in the resist pattern each have a diameter of 4 μm and are two-dimensionally arranged at a pitch of 8 μm.

Figure 3E:
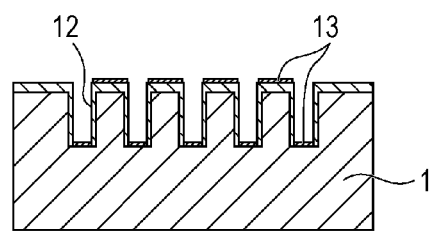
Figure 3B:
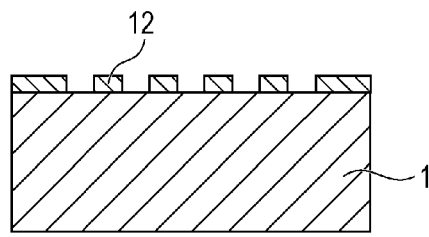

Subsequently, the thermally oxidized silicon film 12 is subjected to reactive etching with $CHF_3$. Thus, a pattern having dots of 4 μm in diameter two-dimensionally arranged at a pitch of 8 μm is formed in the thermally oxidized silicon film 12 in a region of 130 mm in diameter. The dots expose the surface of the silicon substrate (FIG. 3B).

Then, the exposed silicon portions are subjected to anisotropic deep etching by ICP-RIE. This etching is performed up to a depth of about 120 μm and stopped. Thus, silicon pillars 16 of about 120 μm in depth and 4 μm in diameter are formed in the first surface of the silicon substrate 1 with recessed sections 3 therearound (FIG. 3C). Subsequently, the resulting structure is subjected to UV ozone ashing and washed with a mixed solution of sulfuric acid and hydrogen peroxide, followed by rinsing with water and supercritical drying using carbon dioxide.

Then, the structure is thermally oxidized at 1050° C. for 7 minutes to form a thermally oxidized film 12 to a thickness of about 0.1 µm over the surface of the silicon substrate 1 provided with the recessed sections 3 therein by the above-described deep etching. Then, the portions of the thermally oxidized film 12 in the recessed sections 3 are removed by dry etching performed substantially perpendicular to the silicon substrate 1 using $CHF_3$ plasma to expose the surface of the silicon substrate. At this time, the portions of the thermally oxidized film on the side walls of the recessed sections 3 and the tops of the silicon pillars 16 are left (FIG. 3D).

Then, chromium and copper are deposited on the exposed silicon portions in that order to thicknesses of about 7.5 nm an about 50 nm, respectively, in an electron beam evaporation apparatus. Thus a metal film 13 of chromium and copper is formed as a seed layer. Since the electron beam evaporation apparatus performs a directional deposition, the seed layer is formed on the bottoms 9 of the recessed sections and the tops 11 of the pillars (FIG. 3E).

Subsequently, the thermally oxidized film is partially removed from the periphery of the silicon substrate 1 to expose the surface of the silicon substrate 1. This exposed silicon surface is used as an electrode for plating, and the resulting structure is used as a mold to fill the recessed sections 3 with a metal 14 by plating. In Example 1, the metal 14 is gold.

For the gold plating, Microfab Au 1101 (produced by Nippon Electroplating Engineers) is used as the plating solution.

Figure 3F:
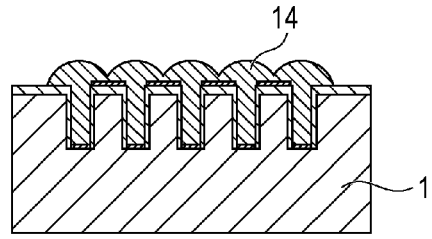
Figure 3C:
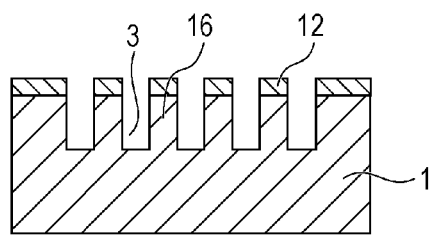

The silicon substrate 1 is immersed in the gold plating solution, and the metal 14 is deposited until overflowing the recessed sections 3 by applying electricity at a current density of 0.2 $A/dm^2$ at 60° C. for 26 hours using the exposed silicon surface as a cathode (FIG. 3F).

The portions of the metal 14 overflowing the recessed sections 3 are removed by CMP (chemical mechanical polishing).

Figure 3G:
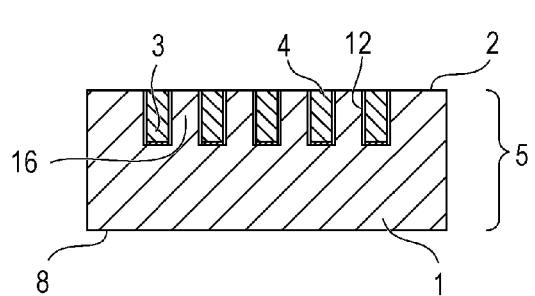
Figure 3D:
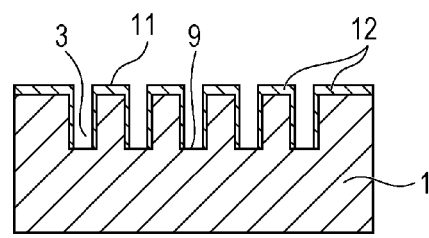

Thus, the recessed sections 3 around the silicon pillars 16 are filled with gold, and thus a mesh-like gold structure is formed in the first surface of the silicon substrate 1 (FIG. 3G).

Figure 2A:
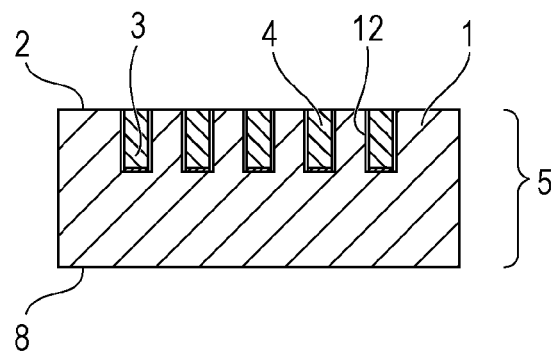
FIGS. 2A to 2E are process diagrams illustrating the method for producing a microstructure of Example 1.

In Example 1, the thus prepared base substrate 5 is used as the base substrate including a silicon substrate 1 provided with recessed sections 3 in a first surface 2 thereof and a metal structure 4 filling the recessed sections 3 (FIG. 2A).

Figure 2B:
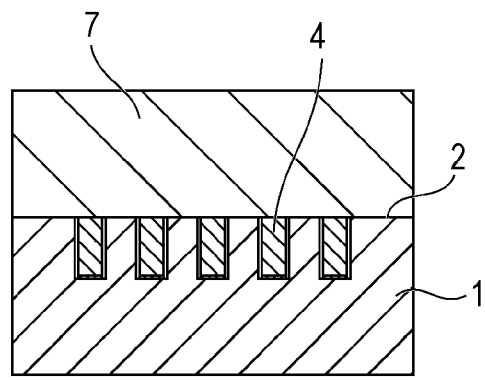

As shown in FIG. 2B, a supporting layer 7 is formed so as to come in contact with the portions of the metal structure 4 exposed at the first surface.

In Example 1, the supporting layer 7 is formed of copper by plating. The base substrate 5 is immersed in a copper sulfate plating solution, and a current of 750 mA is applied to the base substrate 5 from the first surface 2 of the silicon substrate 1 for 18 hours for plating. A copper plate containing phosphorus is used as the anode for the copper sulfate plating. The composition of the copper sulfate plating solution is as follows:

Copper sulfate pentahydrate: 200 g/L
98% Sulfuric acid (undiluted): 14 mL/L
Hydrochloric acid (hydrogen chloride 35%): 0.09 mL/L
Cu-Brite VFII-A (produced by JCU): 20 mL/L
Cu-Brite VFII-B (produced by JCU): 1 mL/L A copper plating layer grows over a region from the upper surface of the metal structure 4 to the first surface 2 of the silicon substrate 1, thus forming a supporting layer 7 having a thickness of about 700 µm over the region from the metal structure 4 to the first surface 2 of the silicon substrate 1.

Figure 2C:
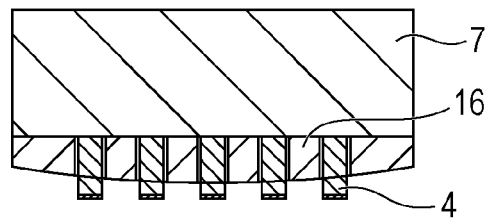

Then, the silicon substrate 1 is removed by etching on the silicon substrate from the second surface 8 thereof (second step, FIG. 2C).

In the present Example, 30% potassium hydroxide aqueous solution heated to 100° C. is used as the etchant for the etching on the silicon substrate 1.

Since the copper of the supporting layer 7 is resistant to potassium hydroxide solution, the etching is selectively performed on the silicon substrate 1 from the second surface 2.

The etching is spontaneously stopped when the silicon substrate 1 is completely removed. At this time, the silicon pillars 16 between the main portions of the metal structure 4 are also removed by this etching.

Figure 2D:
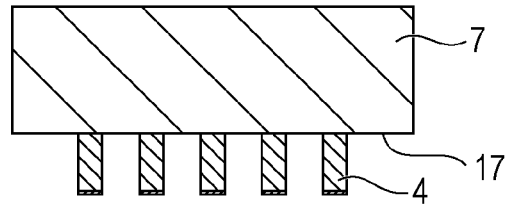

The thermally oxidized film 12 on the side walls of the silicone pillars are also removed by this etching. Thus the metal structure 4 is transferred to the supporting layer 7 from the silicon substrate 1 (FIG. 2D).

Subsequently, the supporting layer 7 is etched from the surface 17 thereof including the contact areas between the metal structure 4 and the supporting layer 7 (third step), thereby being separated from the metal structure 4.

Figure 2E:
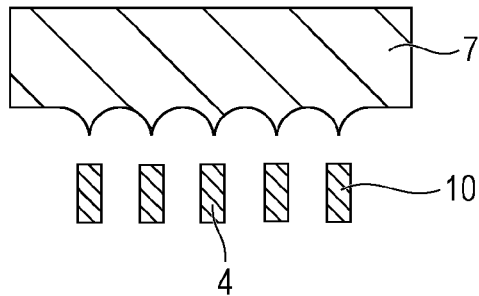

In the present Example, an aqueous solution containing cerium (IV) ammonium nitrate and perchloric acid is used as the etchant. On immersing the structure 19 including the metal structure 4 and the copper supporting layer 7 in the etchant, the surface 17 including the contact areas between the metal structure 4 and the supporting layer 7 is etched, so that the metal structure 4 is separated from the supporting layer 7 to yield a microstructure 10, as shown in FIG. 2E. In the present Example, the microstructure 10 is defined by the metal structure.

The etchant used in the present Example does not foam when etching copper. Also, this etchant does not etch the gold metal structure 4.

On the other hand, the copper and chromium of the seed layer formed by electron beam evaporation can be etched by the etchant. The metal structure (mesh-like gold structure) is therefore separated from the supporting layer 7 to yield a microstructure 10. Although the seed layer is removed from the metal structure in the present Example, it need not be removed.

After being rinsed with water and dried, the mesh-like structure is examined by observation. As a result, local deformation such as recesses, wrinkles, or folds is not observed in the resulting mesh-like structure.

COMPARATIVE EXAMPLE

Figure 7A:
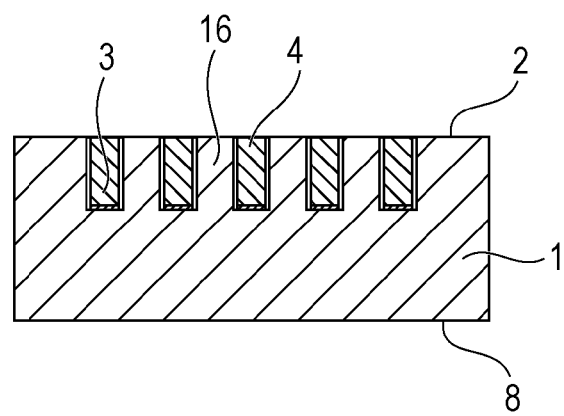
FIGS. 7A to 7C are process diagrams illustrating the method for producing a microstructure of the Comparative Example.
Figure 7B:
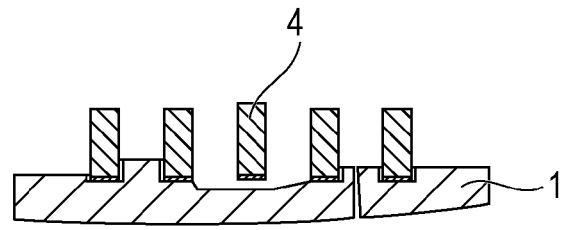

In the Comparative Example, a base substrate, as shown in FIG. 7A, including the same silicon substrate 1 as in Example 1 provided with recessed sections 3 in the first surface 2 thereof and a metal structure 4 filling the recessed sections 3 is used, and the silicon substrate 1 is etched without forming a supporting layer on the metal structure. In the Comparative Example, since the first surface 2 of the silicon substrate 1 is not provided with the supporting layer 7, the silicon substrate 1 is etched from both the first surface 2 and the second surface 8 thereof (FIG. 7B).

As in Example 1, 30% potassium hydroxide aqueous solution heated to 100° C. is used as the etchant for the etching on the silicon substrate 1. When the etching on the silicon substrate 1 proceeded, it is observed that bubbles are violently produced from the entirety of the silicon pillars 16.

In addition, when the etching proceeds further, large bubbles produced from some of the pillars 16 are observed.

Figure 7C:
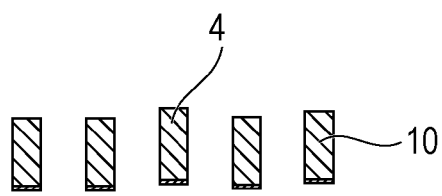

When the etching proceeds still further, the second surface 8 of the silicon substrate 1 is cracked. When the etching is allowed to proceed further so as to completely remove the silicon substrate 1, a microstructure 10 is left in the etchant (FIG. 7C).

After being rinsed with water and dried, the microstructure 10 is examined by observation. As a result, local depressions are observed in the portions from which large babbles has been produced. Folds are also observed in the cracked portion.

Example 2

Example 2 is different from Example 1 in that the supporting layer is formed of nickel. The base substrate is prepared in the same manner as in Example 1, and thus description thereof is omitted.

The supporting layer for the metal structure is formed. In Example 2, the supporting layer is formed of nickel by plating. The base substrate is immersed in a nickel sulfamate plating solution, and a current of 700 mA is applied to the base substrate from the first surface of the silicon substrate 1 at a plating temperature of 50° C. for 15 hours for plating. An SK nickel plate is used as the anode. The composition of the nickel sulfamate plating solution is as follows:

Nickel sulfamate hexahydrate: 450 g/L
Nickel chloride: 14 g/L
Boric acid: 30 g/L
Saccharin sodium: 1.5 g/L
Butynediol: 0.15 g/L A nickel plating layer grows over a region from the upper surface of the metal structure to the first surface of the silicon substrate, thus forming a supporting layer having a thickness of about 550 μm over the region from the metal structure to the first surface of the silicon substrate.

The silicon substrate is etched from the second surface thereof, thus removed (second step).

In the present Example, 30% potassium hydroxide aqueous solution heated to 100° C. is used as the etchant for the etching on the silicon substrate. Since the nickel of the supporting layer is resistant to potassium hydroxide solution, the etching is selectively performed on the silicon substrate from the second surface, and spontaneously stopped when the silicon substrate has been completely removed. At this time, the silicon pillars between the main portions of the metal structure are also removed by this etching.

The thermally oxidized film formed on the side walls of the silicone pillars are also removed by this etching. Thus the metal structure is transferred to the supporting layer from the silicon substrate.

Subsequently, the supporting layer is etched from the contact areas between the metal structure and the supporting layer to separate the metal structure from the supporting layer (third step). Although the third step in the present Example is different from the third step of Example 1 in that a ferric chloride aqueous solution is used as the etchant, the other operation is performed in the same manner, and thus description thereof is omitted.

The surface 17 of the supporting layer 7 including the contact areas between the metal structure and the supporting layer is etched to separate the metal structure from the supporting layer to yield a microstructure 10. The seed layer is separated in the third step in the same manner as in Example 1. After being rinsed with water and dried, the resulting metal structure is examined by observation. As a result, local deformation such as recesses, wrinkles, or folds is not observed in the resulting structure.

Example 3

Example 3 is different from Example 1 in that the supporting layer 7 is etched from the surface 27 thereof opposite the surface thereof including the contact areas with the metal structure 4 in the third step. The first and the second step are performed in the same manner as in Example 1, and thus description thereof is omitted.

Figure 5A:
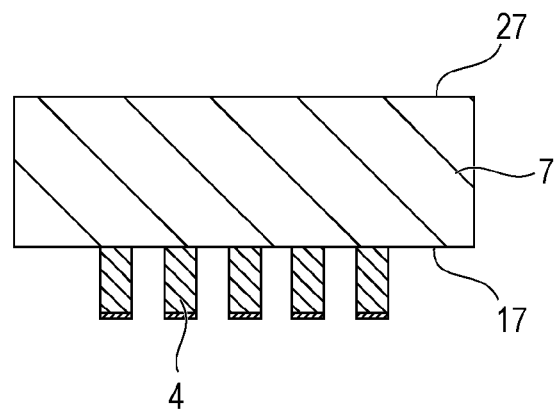
FIGS. 5A to 5E are process diagrams illustrating the method for producing a microstructure of Example 3.
Figure 5B:
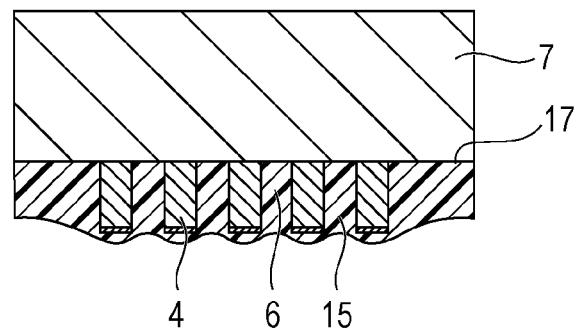

The structure prepared in the second step is shown in FIG. 5A. The structure shown in FIG. 5A is provided with a photoresist layer as an etching mask layer 15 on the surface 17 of the supporting layer 7 including the contact areas between the supporting layer 7 and the metal structure 4 by spin coating, as shown in FIG. 5B.

Figure 5C:
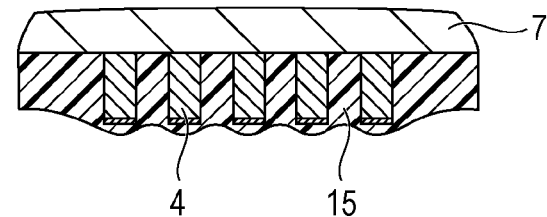

Then, the supporting layer 7 is etched with an aqueous solution containing ammonium persulfate and nitric acid as the etchant (third step), using the etching mask layer 15 as a mask. The supporting layer 7 is thus selectively etched from the surface 27 thereof opposite the surface 17 including the contact areas with the metal structure 4 (FIG. 5C).

Figure 5D:
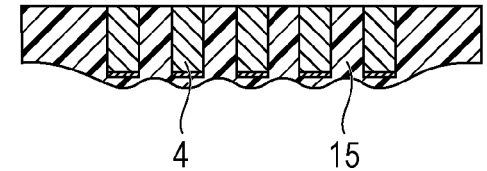
Figure 5E:
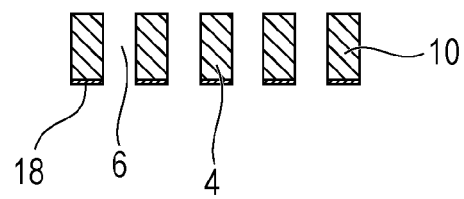

When the etching proceeded further until the supporting layer 7 is completely removed, the metal structure 4 is separated from the supporting layer (FIG. 5D). The etchant used in the present Example does not etch the gold metal structure 4. The structure shown in FIG. 5D may be used as an X-ray shield grating. By removing the etching mask layer 15 from the metal structure 4, however, the X-ray transmission contrast is increased. Accordingly, after being rinsed with water, the structure shown in FIG. 5D is immersed in dimethylformamide. Consequently, the etching mask layer 15 is dissolved, and the metal structure 4 is left (FIG. 5E). On the other hand, since the chromium of the seed layer formed of copper and chromium by electron beam evaporation cannot be etched by dimethylformamide, the seed layer is not separated from the metal structure 4. Hence, the resulting microstructure 10 includes the metal structure 4 and a chromium layer 18 joined to the metal structure 4.

After being rinsed with water and dried, the mesh-like structure is examined by observation. As a result, local deformation such as recesses, wrinkles, or folds is not observed in the resulting mesh-like structure.

Example 4

Example 4 is the same as Example 3 except for the position of the etching mask layer used as the etching mask for the etching on the supporting layer, and thus the description of the first and second steps is omitted.

Figure 6A:
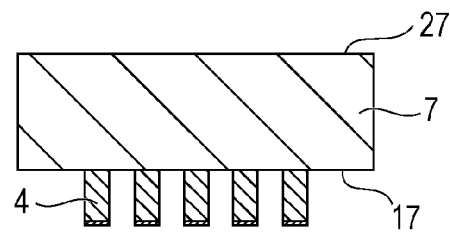
FIGS. 6A to 6E are process diagrams illustrating the method for producing a microstructure of Example 4.
Figure 6B:
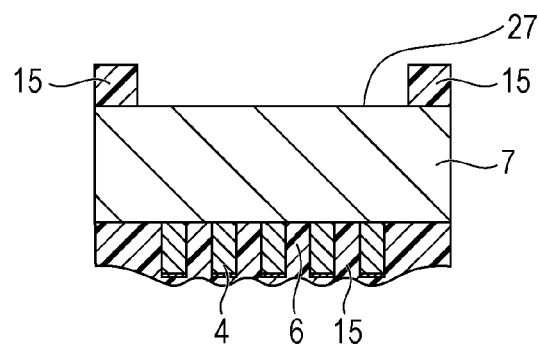

FIG. 6A shows the same structure as FIG. 5A. The structure prepared in the second step is coated with a photoresist layer as an etching mask layer 15 on the surface 17 of the supporting layer 7 including the contact areas between the supporting layer 7 and the metal structure 4, as shown in FIG. 6B. In addition, another etching mask layer 15 is formed in the outer region of the surface 27 of the supporting layer 7 opposite the surface 17 including the contact areas with the metal structure (in the region opposing the region of surface 17 not having contact areas with the metal structure or the paces between the main portions of the metal structure).

Figure 6C:
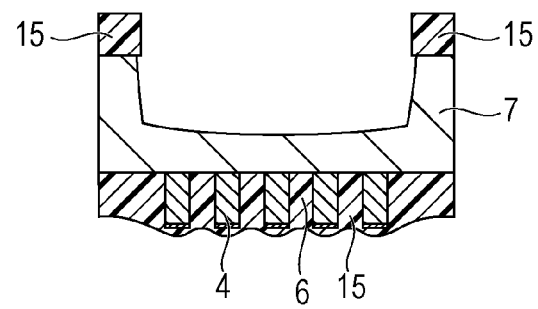
Figure 6D:
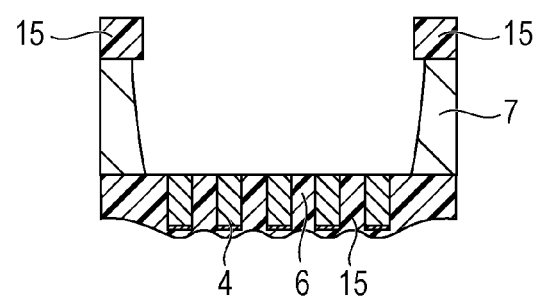
Figure 6E:
Figure 6E:
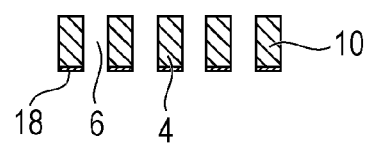

By etching the supporting layer 7 in the same manner as in Example 3, the etching starts selectively from the portion of the surface 27, opposite the surface 17, not coated with the etching mask layer 15 (FIG. 6C). When the etching proceeds further, almost all the supporting layer 7 is removed except for the portion between the etching mask layers 15, thus removed in part from the metal structure (FIG. 6D). At this time, the metal structure 4 remains joined to a part of the supporting layer 7 with the etching mask layer 15 therebetween. Although this structure may be used as an X-ray shield grating as it is, the etching mask layer 15 may be dissolved in the same manner as in Example 3 to yield a microstructure 10 including the metal structure 4 and the chromium layer 18 joined to the metal structure 4 (FIG. 6E). After being rinsed with water and dried, the resulting microstructure is examined by observation. As a result, local deformation such as recesses, wrinkles, or folds is not observed in the resulting structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178957, filed Aug. 30, 2013, and Japanese Patent Application No. 2014-145917, filed Jul. 16, 2014, both of which are hereby incorporated by reference herein in their entireties.

What is claimed is:

1. A method for producing a microstructure, comprising:
the first step of forming a supporting layer on a base substrate including a silicon substrate provided with a recessed section at a first surface thereof and a metal structure filling the recessed section so as to come in contact with the metal structure at the first surface;
the second step of forming a structure including the metal structure and the supporting layer by selectively etching the silicon substrate to expose from the silicon substrate at least a surface of the metal structure, the surface being opposite to a surface thereof in contact with the supporting layer and being in contact with a bottom face of the recessed section; and
the third step of selectively etching the supporting layer of the structure formed in the second step.

2. The method according to claim 1, wherein the etching performed in the second step is wet etching using an etchant, and the etching performed in the third step is dry etching or wet etching using an etchant less foamable than the etchant used in the second step.

3. The method according to claim 1, wherein the etching on the silicon substrate in the second step is performed from a second surface of the silicon substrate opposite the first surface.

4. The method according to claim 1, wherein the etching on the supporting layer in the third step acts at least on the contact area of the supporting layer with the metal structure, thereby separating the metal structure from the supporting layer.

5. The method according to claim 4, wherein the etching on the supporting layer is performed by dissolving the supporting layer in an etchant.

6. The method according to claim 1, wherein the metal structure has a plurality of recessed sections therein, the recessed sections being in a two-dimensional arrangement or a one-dimensional arrangement.

7. The method according to claim 1, wherein at least half the height of the metal structure is exposed from the silicon substrate by the etching on the silicon substrate in the second step.

8. The method according to claim 1, wherein the etching on the silicon substrate in the second step acts on the contact area of the silicon substrate with the supporting layer.

9. The method according to claim 1, wherein the metal structure contains gold.

10. The method according to claim 9, wherein the metal structure is made of gold or an alloy containing gold.

11. The method according to claim 1, wherein the supporting layer contains a metal selected from the group consisting of copper, nickel, iron, and alloys thereof.

12. The method according to claim 1, wherein the supporting layer is formed by plating.

13. The method according to claim 1, wherein the etching on the silicon substrate in the second step is wet etching using an alkaline aqueous solution.

14. The method according to claim 1, wherein the etching on the supporting layer in the second step is wet etching using an etchant containing a metal cation, the etching being performed such that the metal cation oxidizes the supporting layer and is thereby reduced.

15. The method according to claim 1, wherein the metal structure is an X-ray shield grating.

16. The method according to claim 15, wherein the X-ray shield grating is used in an X-ray Talbot interferometer, the shield grating having a period in the range of 2.4 µm to 12 µm, and a thickness of 10 µm or more.

17. The method according to claim 1, the surface of the metal structure in contact with the bottom face of the recessed section is opposite to the surface thereof in contact with the supporting layer.

18. The method according to claim 17, wherein the etching performed in the second step is wet etching using an etchant, and the etching performed in the third step is dry etching or wet etching using an etchant less foamable than the etchant used in the second step.

19. The method according to claim 17, wherein the metal structure has a plurality of recessed sections therein, the recessed sections being in a two-dimensional arrangement or a one-dimensional arrangement.

20. A method for producing a microstructure, comprising:
the first step of forming a recessed section at a first surface of a silicon substrate;
the second step of filling the recessed section with a metal to form a base substrate including the silicon substrate and a metal structure;
the third step of forming a supporting layer on the base substrate including the silicon substrate and the metal structure so as to come in contact with the metal structure at the first surface; and
the fourth step of forming a structure including the metal structure and the supporting layer by selectively etching the silicon substrate to expose from the silicon substrate at least a surface of the metal structure, the surface being opposite to a surface thereof in contact with the supporting layer and being in contact with a bottom face of the recessed section; and
the fifth step of selectively etching the supporting layer of the structure formed in the fourth step.

* * * * *